(12) United States Patent
Neumann et al.

(10) Patent No.: US 12,353,348 B2
(45) Date of Patent: Jul. 8, 2025

(54) LOW LATENCY COMMAND PROPAGATION PROTOCOL

(71) Applicant: INOVA SEMICONDUCTORS GMBH, Munich (DE)

(72) Inventors: Roland Neumann, Munich (DE); Michael Riedel, Munich (DE); Stefan Hoffmann, Munich (DE); Yanqin Li, Munich (DE)

(73) Assignee: INOVA SEMICONDUCTORS GMBH, Munich (DE)

( * ) Notice: Subject to any disclaimer, the term of this patent is extended or adjusted under 35 U.S.C. 154(b) by 277 days.

(21) Appl. No.: 18/098,481

(22) Filed: Jan. 18, 2023

(65) Prior Publication Data
US 2023/0289317 A1 Sep. 14, 2023

Related U.S. Application Data

(63) Continuation of application No. PCT/IB2021/058874, filed on Sep. 29, 2021.

(30) Foreign Application Priority Data
Mar. 17, 2021 (EP) .................................... 21020156

(51) Int. Cl.
G06F 13/20 (2006.01)
G06F 13/40 (2006.01)
G06F 13/42 (2006.01)

(52) U.S. Cl.
CPC ...... *G06F 13/4282* (2013.01); *G06F 13/4068* (2013.01)

(58) Field of Classification Search
CPC ............. G06F 13/4282; G06F 13/4068; H04L 12/40169; H04L 2012/40215; H04L 2012/40273
See application file for complete search history.

(56) References Cited

U.S. PATENT DOCUMENTS

| 5,708,660 A | * | 1/1998 | Riedel | ............... H04Q 11/0478 370/397 |
| 2017/0150464 A1 | * | 5/2017 | Kazehaya | ............ H04L 12/422 |

(Continued)

FOREIGN PATENT DOCUMENTS

| CA | 3 125 682 A1 | 10/2020 |
| WO | 2020/052801 A1 | 3/2020 |

(Continued)

OTHER PUBLICATIONS

International Search Report issued by the European Patent Office for International Patent Application No. PCT/IB2021/058874, mailed on Jul. 1, 2022.

*Primary Examiner* — Henry Tsai
*Assistant Examiner* — Kim T Huynh
(74) *Attorney, Agent, or Firm* — Myers Wolin, LLC

(57) ABSTRACT

A system arrangement and method are provided for allowing the operation of units in a fail safe manner and at low latency. The teachings suggest a specific protocol which allows switching and routing of packages for addressing and controlling light emitting diodes and reading out sensors. The information is distributed according to very specific requirements of the underlying topology and application domain. As light emitting diodes and sensors may affect the reliability of security features in a vehicle specialized approaches have to be provided considering both real-time requirements and reliability. In such a method, a branch device can change its operation mode without an explicit command but, in general, a command may provide an expiry condition of a mode after which the mode returns to its previous mode. Such an expiry condition may be the reception of a predefined number of specific network events.

14 Claims, 15 Drawing Sheets

(56) References Cited

U.S. PATENT DOCUMENTS

| | | | | |
|---|---|---|---|---|
| 2019/0356564 A1* | 11/2019 | Kaneko | .................... | H04L 43/04 |
| 2023/0254327 A1* | 8/2023 | Schmidt | .................. | H04L 67/12 |
| | | | | 726/23 |
| 2023/0262071 A1* | 8/2023 | Stireciu | ............... | H04L 63/1416 |
| | | | | 709/224 |
| 2023/0289317 A1* | 9/2023 | Neumann | ......... | H04L 12/40169 |

FOREIGN PATENT DOCUMENTS

| | | |
|---|---|---|
| WO | 2020/052802 A1 | 3/2020 |
| WO | 2020/052806 A1 | 3/2020 |

* cited by examiner

LOW LATENCY COMMAND PROPAGATION PROTOCOL

CROSS REFERENCE TO RELATED APPLICATIONS

This application is a continuation of International Application No. PCT/IB2021/058874, filed on Sep. 29, 2021, which takes priority from European Patent Application No. 21020156.2, filed on Mar. 17, 2021, the contents of each of which are incorporated by reference herein.

TECHNICAL FIELD

The present invention is directed towards a system arrangement and method which allows the operation of units in a fail safe manner and at low latency behavior. The teachings suggest a specific protocol which allows switching and routing of datagrams and/or frames for controlling light emitting diodes and reading sensors. The information is distributed according to very specific requirements of the underlying topology and application domain. The automotive sector poses very restrictive requirements especially security relevant devices are involved. As light emitting diodes and sensors may affect the reliability of security features in a vehicle specialized approaches have to be provided considering both real-time requirements and reliability. One of the provided advantages is that for instance a branch device can change its operation mode without an explicit command but, in general, a command may provide an expiry condition of a mode after which the mode returns to its previous mode. Such an expiry condition may be the reception of a predefined number of specific network events. In addition, a computer program product is proposed comprising control commands which carry out the method or operate the device.

BACKGROUND

CA 3,125,682 A1 shows the actuation of execution units without referring to operation modes.

WO2020/052801 A1 shows a system arrangement for the fault-tolerant and electromagnetically compatible control of a plurality of execution units.

WO2020/052802 A1 shows a line driver device which allows, for example in a system arrangement for controlling execution units, a first or second communication path to be selected for further data flow with little technical effort. Furthermore, the line driver device according to the invention is particularly fault-tolerant and suitable, inter alia, for use in a car.

WO2020/052806 A1 shows a line driver device which allows, for example in a system arrangement for controlling execution units, a first or second communication path to be selected for further data flow with little technical complexity. In addition, the proposed line driver device is particularly fault-tolerant and suitable, inter alia, for use in an automobile.

Current fieldbus solutions such as CAN or LIN bus communication standards such as I2C or SPI do not meet the requirements of a communication network for (many) dynamically controlled LEDS in combination with sensors and probes. LIN with 20 kBit/s is much too slow to create dynamic lighting effects with LEDs. Also, the maximum number of 16 clients is much too low to meet today's requirements for an indoor communication system. CAN offers with 2-4 Mbits a much higher bandwidth, but it is multi-master capable with the necessary arbitration for a deterministic distribution of data and thus makes dynamic effects and especially the synchronization of dynamic lighting effects impossible. Again, the maximum number of supported clients is much too low at 64. In addition, the complexity of the individual CAN nodes is far too high, which leads to unacceptable costs.

I2C is a communication technology designed for serial connection of semiconductor components on PCB. Again, the typical data rate of 400 kBits is too low for dynamic lighting effects. Due to the single-ended signaling, this bus is too much susceptible to interference when transmitting over wires.

SPI is also a communication technology designed for serial connection of semiconductor components on PCB level. However, due to the shift register architecture the number of clients increases, resulting in completely unacceptable latencies.

Ethernet is perfectly suited in terms of bandwidth and number of supported clients, but is far too complex to be implemented in any LED, sensor or push-button device. In addition, Ethernet cannot achieve the required high immunity to interference without an additional common-mode choke on the cable interface.

The interior of a vehicle as a whole represents the human machine interface HMI to the vehicle. In addition to the well-known control elements such as steering wheel, brake and accelerator to control the vehicle, displays, switches, buttons and signal lights and light emitting diodes LEDS realize a complex HMI to configure and personalize the vehicle, but also to communicate with driver assistance systems or to be warned by them.

Since the first vehicle, this HMI in its entirety has continuously grown in functionality and diversity with regard to the realization of HMI elements.

Due to the varying availability of technology, but also due to the constantly newly developed functions, a mix of haptic elements such as buttons, switches and "touch solutions" and visual elements such as signal and warning lights or displays and dynamic lighting elements has been created.

A large number of these elements have individual controls with a wide variety of protocols, often limited to a single functional unit. This, simply because of the technologies available at the time of creation. Thus, the vehicle HMI today is a hodgepodge of different elements, which practically cannot interact with each other.

The interior of a vehicle today represents a highly complex HMI, which affects the driver in its entirety and must be operated by the driver in addition to the actual task of controlling the vehicle. The driver is often overstrained at the expense of driving safety.

A cross-functional HMI concept, which evaluates and doses information according to the situation or possibly conveys it to the driver in a very penetrating way, combining all technological possibilities into a complete system, such as displays and LEDs to display information and contactless gesture communication or even speech recognition to control actions, is elementary for driving safety but also for the well-being of the driver and passengers in general.

This requires a customized communication system that combines display elements, sensors and haptic elements in a communication network and thus enables coordinated control of these.

The network should be able to drive large numbers (many 100 up to 1000) of LEDs dynamically, with lowest latency and synchronously. LEDs can be color or white LEDs. Furthermore, a limited number (less than 50) of sensor elements shall be controlled and read. In addition, a limited number (<50) of haptic elements such as buttons and switches should be recognized with lowest latency (reaction time <100 ms).

SUMMARY

Accordingly it is an object of the present invention to provide an improved system arrangement that allows a real-time and fail-safe propagation of commands throughout a specialized hardware architecture. In addition, an object of the present invention is to propose a line driver unit for use in the proposed system arrangement and a method for providing or operating the proposed system arrangement. In addition, a computer program product comprising control commands which carries out the method or operates the system arrangement is to be proposed.

The object is achieved by the features of the independent claims. Further advantageous embodiments are specified in the dependent claims.

Accordingly, a system arrangement for use in an automobile for low latency and fail-safe command propagation allowing a targeted actuation of each of a plurality of client devices in real-time is suggested, comprising an initiator device arranged to generate and initiate commands; a series of branch devices communicatively coupled to the initiator device via an Initiator Side Port, the series of branch devices being communicatively connected using a transmission medium; the plurality of client devices being segmented into a plurality of serial branches each of at least two client devices along a branch type data line each branch being connected to respectively one branch device, characterized in that each branch device directly provides commands generated and initiated by the initiator device to respectively a first client device using a Client Side Port of respectively one branch being connected with the branch device according to a configured mode, wherein the command is further propagated to the at least one further client device via the Client Side Port of the respective branch device, the mode being configured as a function of the generated command and by a number of received link attention event, wherein the command provides an expiry condition of the mode after which the mode returns to its previous mode and the mode rules that a first pair of ports is addressed using a switch mode, while packages on a path of a separate pair of ports may be routed, wherein at least one branch device is operated in a state in which the branch device performs network relevant operations and performs device specific functions, the branch device performing switching or routing operations on pairwise ports according to the configured mode, the mode comprising: a mode where all incoming packages are forwarded; a mode where packages are only forwarded in case of an address match where the command provides an address of at least one branch device; a mode where the connected client devices are read out; a mode where the connected client devices are instructed; a mode where incoming commands are first parsed; a mode where incoming commands are directly passed on; and/or a mode where an incoming command is adapted as a function of a branch device address. The at least two client devices do not necessarily need to be present in any branch. There might also be empty branches.

Hence, a system arrangement is suggested for use in an automobile for low latency and fail-safe command propagation which provides the advantage that the propagation mode is configured by the command and/or afterwards by a number of received link attention events. Hence, there is the possibility to set the mode directly using the command or specify a fallback criteria where the mode or state switches back to the previous mode or to another specified mode. Hence, no further switch instruction is to be transmitted. This is of special advantage in case the connection breaks and moreover is fast to implement.

Allowing a targeted actuation of each of a plurality of client devices in real-time aims at the addressing of the branch devices and especially the client devices. The commands are transmitted via the branch devices to the client devices where actions are triggered. The actions may comprise reading out a sensor or setting a RGB color. Moreover scanning connected entities with address assignment can be performed.

An initiator device is arranged to generate and initiate commands which may operate a micro controller and hence provides the active entity in the architecture that addresses the branch devices and hence the client devices. The initiator device is connected with the first branch device and indirectly communicates using this branch device with the further entities.

A series of branch devices is communicatively coupled to the initiator device via an Initiator Side Port of the first branch device, while the series of branch devices is communicatively connected using a transmission medium. The branch devices are coupled using their initiator side port and their extension side port. They are connected in series. The plurality of client devices is segmented into a plurality of serial branches each of at least two client devices along a branch type data line each branch being connected to respectively one branch device. A branch may also be referred to as a sub chain. The number of client devices can be up to several thousands, which are all organized in their respective branch.

Each branch device directly provides commands generated and initiated by the initiator device to respectively a first client device using a Client Side Port of respectively one branch being connected with the branch device according to a configured mode. The configured mode indicates how the packages are transmitted. They may be transmitted in switch mode or routing mode. Switch mode means that between pairwise ports the packages are passed through without parsing or processing. Routing means that these packages are at least parsed, meaning the address, if present, is checked, the instruction along with parameters is checked and potentially processing is performed. Summarizing this switching may be referred to as passing on without processing steps or performing processing steps only after passing on while routing executes processing steps before passing the datagram, frame or command on.

In general a package can likewise be called datagram and these notions can be used interchangeably.

The command or package is further propagated to the at least one further client device via the Client Side Port of the respective branch device and hence distributed along the branch. The mode being configured as a function of the generated command and/or by a number of received link attention events rules which mode or state is implemented. This affects the switching and/or routing function. A mode may rule that a first pair of ports is addressed using a switch mode, while packages on a path of a separate pair of ports may be routed. Hence, a mode can operate both modes at the same time but between different pairs of ports. In general a port may be referred to as interface.

The basic function of a network according to the invention is controlling large numbers (many 100 up to 1000) of LEDs dynamically, with lowest latency and synchronously.

LEDs can be color or white LEDs. Furthermore, a limited number (less than 50) of sensor elements shall be controlled and read. In addition, a limited number (<50) of haptic elements such as buttons and switches should be recognized with lowest latency (reaction time <100 ms).

In this overall context real-time refers to the fact that the human eye will not detect or perceive any delay. Hence, the unarmed eye will conceive real-time actions as happening immediately. This means that in human perception there is no delay in command propagation and/or execution, while from a technical view an undesired delay occurs due to latency times. Summarizing this, a limited number (<50) of haptic elements such as buttons and switches should be recognized with lowest latency (reaction time <500 ms, while a reaction time of <100 ms is preferable). A reaction time of <500 ms, while a reaction time of <100 ms is preferable, for any LED is achieved according to the suggested topology and architecture according to an aspect of the present invention. Reaction times refer to the transmittal of a command from the initiating unit, initiator for short, to the target unit, namely the LED, sensor, client unit, branch device or the like.

A network according to the invention may consist of individual nodes arranged in a point-to-point topology. A node belongs to exactly one of three node types:
Initiator Device
Branch Device
Client Device Each network according to the invention has exactly one Initiator Device—typically a microcontroller or a FPGA. The Initiator Device is connected to a daisy-chain of Branch Devices. The transmission medium between Branch Devices shall be Unshielded Twisted Pair UTP cables. At each Branch Device it is possible to attach another daisy-chain of Client Devices. The structure of a Branch Device and its Client Devices forms a Branch. Representatives of Client Devices are typically based on the ISELED bare die chip INLC100D. An assembly of this chip together with LEDs forms a system in package for integrated lighting solutions. The standalone device without integrated LEDs is called INLC10AQ and functions as a transceiver device only.

For future applications, sensors or haptic elements with integrated ISELED interface are also possible as Client Device. The initiator of a network initiates transactions that are provided in the API.

According to an aspect of the present invention the mode is configured at least between pairwise communication ports of each branch device, the communication ports comprising an Initiator Side Port, a Client Side Port and/or an Extension Side Port. This provides the advantage that the pairwise ports can be operated independently and hence switching and routing can be performed at the same time but with different pairs of ports which allows the operation of different propagation modes.

According to a further aspect of the present invention received link attention events are formed by at least one decoded Frame Synchronization event, at least one command, at least one downstream frame, at least one upstream frame, at least one received message, at least one executed command and/or at least one instruction. This provides the advantage that switch criteria can be defined using several types of communication packages. Hence, the network traffic can be observed and upon fulfilling a certain criteria the mode is changed.

According to a further aspect of the present invention the number of received link attention events is specified by the generated command or a predefined threshold. This provides the advantage that the limit of reached events can be transmitted by the initiator device are can be defined by the protocol specifying an upper boundary of received events such that the mode is switched. The threshold can be defined in the command.

According to an aspect of the present invention each generated command comprises Frame Synchronization data arranged to indicate a frame start. This provides the advantage that the received link attention events can easily be detected by counting the received Frame Synchronization data. As each command comprises Frame Synchronization data the number of commands equals the number of Frame Synchronization data frames.

According to a further aspect of the present invention a mode specifies switching, routing, parsing and/or transmission of packages between pairwise ports. This provides the advantage that a protocol can be implemented which combines several actions in respectively one mode.

According to a further aspect of the present invention each branch device is operated according to a protocol, which is implemented by the initiator device specifying rules according to which each branch device is operated in one state out of a number of states. This provides the advantage that states can be provided according to pre-defined rules which can be designed using empirically obtained data. The invention is tailored to the underlying hardware architecture and allows an efficient control flow.

According to an aspect of the present invention at least one branch device is operated in a state in which the branch device performs network relevant operations and performs device specific functions, the branch device performing switching or routing operations on pairwise ports according to the configured mode. This provides the advantage that routing and switching can be combined. The above indicated modes and states are empirically identified and cover all aspects of network management as required in the current automotive scenario.

According to a further aspect of the present invention the client devices are implemented by light emitting diodes and/or sensors and are address per branch by the respective branch device which forwards commands from the initiator device. This provides the advantage that specialized infra-structures for operating the components can be provided. The invention recognizes that the suggested protocol is highly appropriate for components which are typically applied in large numbers and are connected in series.

According to a further aspect of the present invention in case of a loss of voltage, a loss of current, an undefined behavior of the branch device an incoming port passes incoming packages through to an outgoing port without further processing, parsing, routing or switching steps. This provides the advantage that the branch device is made transparent or technically invisible to further branch devices and packages are merely handed through without processing. In this way only the client devices cannot be addressed which are directly connected with the failed branch device. The client devices of further branch devices are still operable.

According to an aspect of the present invention the branch type data line is arranged on a printed circuit board and/or connects printed circuit boards. This provides the advantage that different implementation techniques are provided which can even be combined.

According to a further aspect of the present invention the transmission medium comprises respectively one Unshielded Twisted Pair Cable in between pairwise branch devices or one single Unshielded Twisted Pair Cable along which all branch devices are arranged. This provides the advantage that different implementation techniques are provided which can even be combined. They take care of the specific transmission characteristics and are easy to be implemented.

The object is also solved by a method for use in an automobile for low latency and fail-safe command propagation allowing a targeted actuation of each of a plurality of client devices in real-time, comprising operating an initiator device arranged to generate and initiate commands; operating a series of branch devices communicatively coupled to the initiator device via an Initiator Side Port, the series of branch devices being communicatively connected using a transmission medium; operating the plurality of client devices being segmented into a plurality of serial branches each of at least two client devices along a branch type data line each branch being connected to respectively one branch device, characterized in that each branch device directly provides commands generated and initiated by the initiator device to respectively a first client device using a Client Side Port of respectively one branch being connected with the branch device according to a configured mode wherein the command is further propagated to the at least one further client device via the Client Side Port of the respective branch device, the mode being configured as a function of the generated command and by a number of received link attention events, wherein the command provides an expiry condition of the mode after which the mode returns to its previous mode and the mode rules that a first pair of ports is addressed using a switch mode, while packages on a path of a separate pair of ports may be routed, wherein at least one branch device is operated in a state in which the branch device performs network relevant operations and performs device specific functions, the branch device performing switching or routing operations on pairwise ports according to the configured mode, the mode comprising: a mode where all incoming packages are forwarded; a mode where packages are only forwarded in case of an address match where the command provides an address of at least one branch device; a mode where the connected client devices are read out; a mode where the connected client devices are instructed; a mode where incoming commands are first parsed; a mode where incoming commands are directly passed on; and/or a mode where an incoming command is adapted as a function of a branch device address.

The object is also solved by a computer program product comprising instructions to cause the arrangement to execute the steps of the method as well by a computer-readable medium having stored thereon the computer program.

It is of special advantage that the method as suggested above can be executed using structural features of the suggested device and control unit. Accordingly the method teaches steps which are arranged to operate the suggested device. Furthermore, the device comprises structural features allowing the accomplishment of the suggested method. In addition a computer program and a computer program product respectively is suggested comprising instruction which perform the suggested method when executed on a computer or the device according to the present invention. Furthermore, the instructions provide means for implementing the structural features of the claimed device. Accordingly an operable image of the structural features of the device can be created. Likewise an arrangement comprising the structural device features is provided.

Wherever, structural features are provided they can likewise be established virtually thereby creating a virtual instance of physical structures. For instance a device can likewise be emulated. It may be the case that single sub steps are known in the art but the overall procedure still delivers a contribution in its entirety.

BRIEF DESCRIPTION OF THE DRAWINGS

Further advantages, features and details of the invention emerge from the following description, in which aspects of the invention are described in detail with reference to the drawings. The features mentioned in the claims and in the description can each be essential to the invention individually or in any combination. The features mentioned above and those detailed here can also be used individually or collectively in any combination. Functionally similar or identical parts or components are in some cases provided with the same reference symbols. The terms "left", "right", "top" and "bottom" used in the description of the exemplary aspects relate to the drawings in an orientation with normally legible figure designation or normally legible reference symbols. The aspects shown and described are not to be understood as conclusive, but are exemplary for explaining the invention. The detailed description is provided for the information of the person skilled in the art; therefore, in the description, known circuits, structures and methods are not shown or explained in detail in order not to complicate the understanding of the present description. The invention will now be described merely by way of illustration with reference to the accompanying figures, which show:

DETAILED DESCRIPTION

Figure 1:
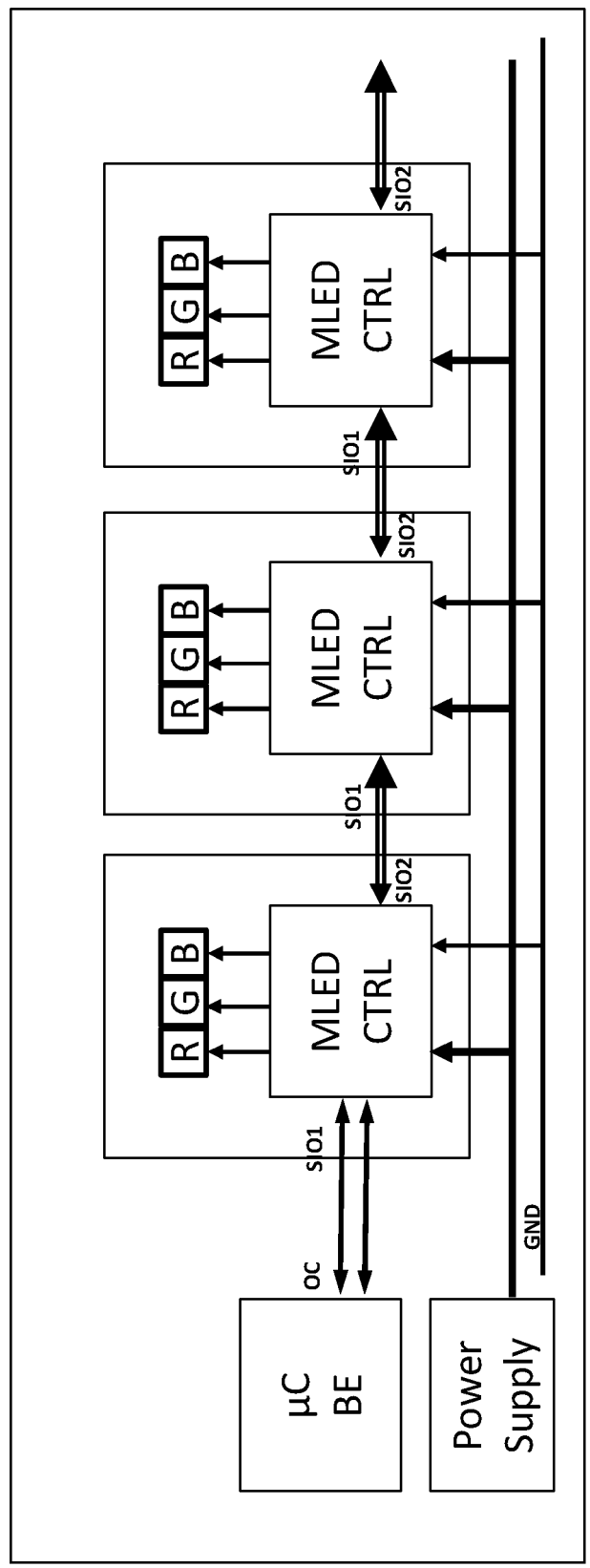
FIG. 1: a sub-chain comprising a microcontroller and a plurality of LED units connected in series according to the prior art.

FIG. 1 shows a possible configuration of a system or communication arrangement according to the prior art. Thus, in this case, the command unit BE, which is connected to three control units, can be seen on the left side. Since the three control units are connected in series, the command unit is directly connected to a control unit and indirectly connected to the further control units. The control units may be multi-LED controllers. This is denoted in FIG. 1 as MLED CTRL. The unitary reference sign is intended to illustrate in particular that the control units are typically configured identically. As can be seen here, the LEDs are RGB (red, green, blue) LEDs. These are set up to set a particular colour value by means of a mixing ratio of the individual LED units. Further, it can be seen in this drawing that further components are to be provided as required. For example, it may be necessary to provide a power supply. In this context, it is also possible, however, to provide these components, for example the power supply, externally and merely to connect them.

The left side of FIG. 1 shows a microcontroller which acts for example as a command unit. Moreover, a plurality of execution units, in this case implemented as LED controllers, are arranged with bidirectional communication. This is indicated by reference sign MLED CTRL. For some application scenarios, the prior art has the drawback that, if a controller fails, all further controllers connected in series also fail, since communication is suppressed.

The data line is in this case in the form of a plurality of data line segments, which are indicated as bidirectional arrows SIO1, SIO2. Control units may also be referred to as execution units. The MLED controller may also be referred to as an ISELED controller, such as may according to the invention be used as an execution unit.

Figure 2:
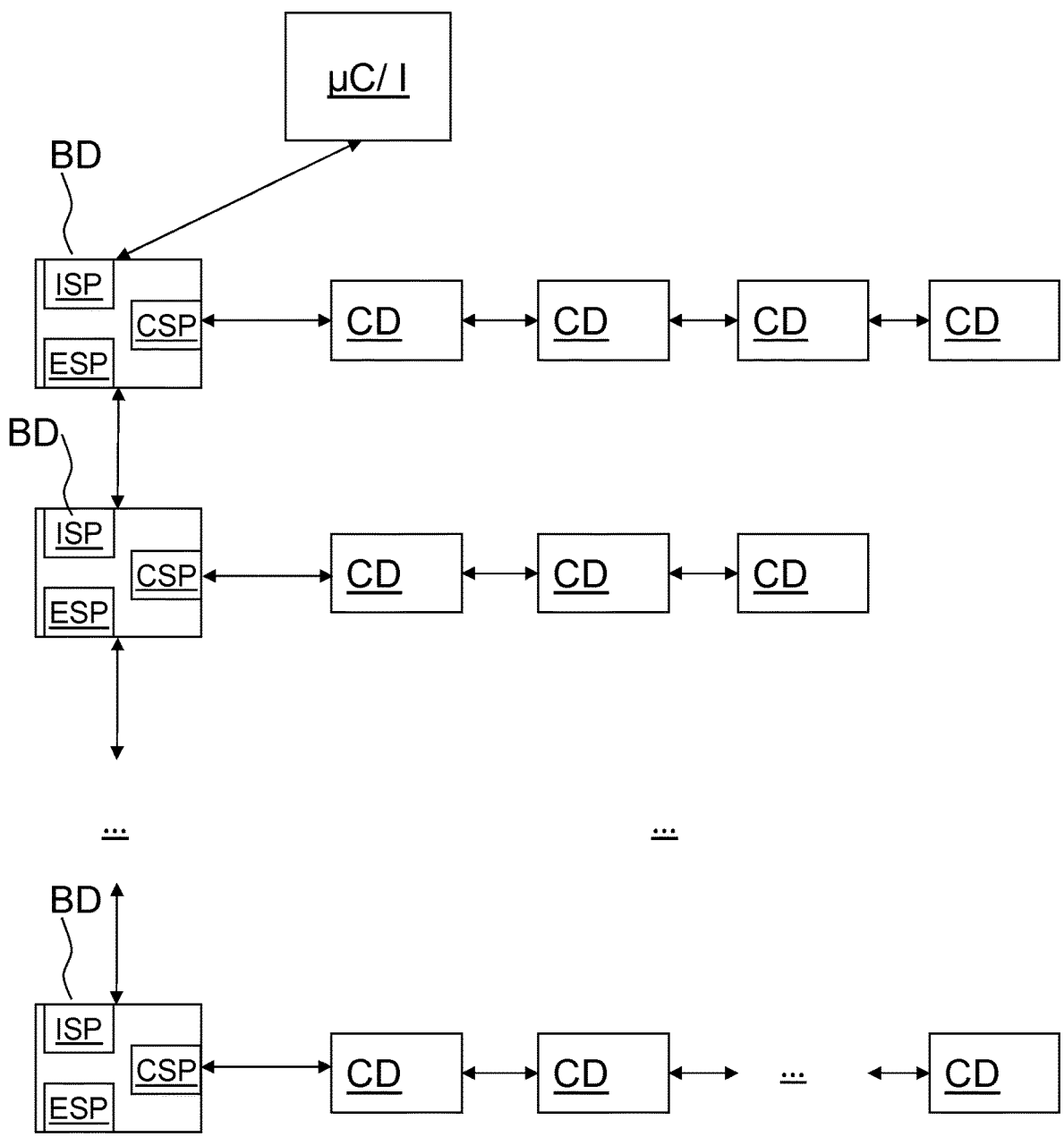
FIG. 2: a block diagram of a system arrangement for use in an automobile for low latency and fail-safe command propagation allowing a targeted actuation of each of a plurality of client devices in real-time according to an aspect of the present invention.

FIG. 2 shows the proposed construction of a system arrangement, the command unit BE taking the form of a microcontroller. This branch device BD is communicatively coupled to a plurality of branch devices BD. The initiator device I is connected via the second data line to the branch device BD connected in series. For this purpose, each branch device BD has three interfaces, namely interfaces ISP, CSP and ESP. As is illustrated here, a branch device BD communicates with a sub-chain of client devices CD. These client devices CD are likewise connected in series, and communicated by means of the first data line.

As is also shown, there is a plurality of sub-chains also referred to as branches, each sub-chain comprising a branch device BD and at least one client device CD. There are thus also a plurality of data lines of the first type, merely three sub-chains, in other words three first data lines, being illustrated.

The proposed system scales, this being marked by drawing in dots between the second sub-chain and the third sub-chain. These dots clarify that there may be a plurality of an indeterminate number of sub-chains. The number is merely limited by the address space. The bottom right of FIG. 2 shows that a different number of client devices CD may be provided, this likewise being indicated by dots. In this case too, the address space is decisive as to the number of client devices CD.

In FIG. 2, in each case the first data line is illustrated horizontally and the second data line is illustrated vertically. The second data line also refers to the connection between the command units BE and the plurality of branch devices BD. As a whole, the horizontal sub-chains may in each case be arranged on a circuit board, while a wired connection can be implemented between the vertical connection. Thus, vertically, larger distances of several metres can still be overcome. Herein, vertically and horizontally merely refer to the drawing, as a person skilled in the art will appreciate that the actual implementation will be in accordance with the requirements.

A branch device BD is a communication unit comprising four ports:
ISP—Initiator Side Port
ESP—Extension Side Port
CSP—Client Side Port
GPIO In case the Branch Device is the first position in the network, the GPIO interface is used for interconnection of Branch and Initiator Device. To define the first position, the ISP_P and ESP_N pins are shorted.

In case the Branch Device is not the first position in the network, the ISP is connected to the ESP of the previous Branch Device via Unshielded Twisted Pair UTP cable. In that case, the GPIO interface is not used for ILaS protocol transactions and is available to detect sensor signals or to control actuators. Subsequent Branch Devices can be connected via RSP. The use of CSP is optional. ILaS is a registered trademark and refers to the concepts according to the present invention.

In case of a Branch Device error (unpowered device, EOS, misfunction of communication etc.), a passive emergency path shall be provided in order to operate the rest of the ILaS network. This path shall consist of two serial 50Ω resistors, resulting in a 100Ω path. In error-free mode, a GND-connection between these resistors shall be enabled in order to provide a 50Ω termination of the transceiver blocks Among other things, the proposed system arrangement is error-tolerant, since the client devices are segmented and therefore arranged in sub-chains. This results in series sub-chains, the individual client devices being connected in succession. Thus, if one of the client devices fails, adverse effects only occur within the sub-chain in which the failing client device is arranged. This has the advantage over the prior art that, instead of a plurality of further client devices connected in series failing, merely client devices in the same segment fail. This can also be deal with in that in the event of a failure the client devices are merely connected through.

The client devices are coupled in series, preferably bidirectionally. It is thus possible for the client devices to receive commands conveyed from the branch device and subsequently to implement them. A command may involve an instruction or else reading out or setting a parameter. Thus, the client devices may be provided as LED units which actuate individual LEDs. LEDs typically take the form of red, green and blue LEDs, it also being possible that a white LED is to be provided. The client devices therefore implement the commands of the branch device and are additionally able to provide a return value. It is thus possible for the branch device to instruct the client device to read out a sensor, and by means of the bidirectional communication the client device can return a readout temperature value of the sensor.

Since according to embodiments of the invention there are a plurality of sub-chains or segments, an error does not adversely affect the entire sub-chain as is disclosed in the prior art, and also according to embodiments of the invention not all sub-chains but only one (the relevant) sub-chain, but rather the failure safety is increased in that separate sub-chains are formed which are to be actuated individually. Non-exclusively, the sub-chains include at least one client device, a branch device being connected upstream from each sub-chain. The error tolerance is also ensured in that the branch devices pass signals through in the event of an inactive state. Passing through generally describes passing signals on without processing them. As a result, no logic is implemented and no processing steps are carried out within the failed element. Rather, a signal present at an input is outputted again at the output without any processing.

Electromagnetic acceptability when a plurality of client devices are actuated can be brought about in that, among other things, a differential modulation is always provided, in other words the line is actively driven even when no order is being transmitted. As a result, a steep flank which occurs when the line driver is switched on and off is dispensed with. According to embodiments of the invention, it is possible to implement the proposed topology in such a way that a wired connection (optical or electrically differential) is produced at least between the branch devices. As a result, the data line is not implemented on a circuit board in the conventional manner, but rather the individual sub-chains are merely arranged on a circuit board, and the resulting circuit boards can be communicatively coupled via the associated branch device by means of a wired connection (optical or electrically differential). It is thus particularly advantageous that the number of sub-chains scales because any desired number of branch devices can be connected in series and a sub-chain of client devices is communicatively arranged or coupled at each branch device.

In general, the number of client devices to be operated or of branch devices is limited by the address space, in other words the number of units which can be addressed. Since the address space can be selected as desired, the number of units to be installed thus also scales.

The proposed system arrangement also provides, among other things, an initiator device which ultimately controls the individual client device. This typically does not take place directly, but rather via the branch devices. The initiator device thus generates commands and conveys them to the client devices via the associated branch devices, or receives parameters and values from the client devices via the branch devices. The initiator device thus represents a superordinate instance with respect to the branch devices, and can thus be referred to as a master unit. In this case, the branch devices behave as slave units or client units. Since the branch devices are connected upstream from the sub-chains, in other words the client devices, and the branch devices convey the commands to the associated sub-chains, in this regard the branch devices behave like master units with respect to the client devices. The client devices thus take on the role of the slave unit or client unit.

For example, the proposed system arrangement takes the form of an LED chain. For this purpose, the initiator device outputs a particular pattern which is to be implemented by means of the individual LEDs. For this purpose, the initiator device actuates the individual branch devices, which subsequently pass on the command to the associated sub-chain.

The branch devices can not only pass on the command, but also independently adapt the command. The individual client devices implement the command and actuate for example individual LEDs. Again, these may be the LEDs red, green and blue, it also optionally being possible to provide a white LED. The client devices may also take the form of other actuators, such as motors, matrix LEDs, sensors, temperature sensors, light sensors or scanners.

The first data line is the data line formed by sub-chains. The first data line thus connects the individual client devices and connects this chain of client devices to exactly one branch device. The data line thus initially comprises a branch device to which a client devices is connected. Optionally, further client devices are connected to this client device in series. Again, there is no restriction on the number of client devices, but rather the underlying address space is merely selected accordingly. In this context, the address space need not be fully exhausted, but rather the address space merely represents an upper limit on the number of client devices to be installed.

The second data line interconnects the branch devices in series and preferably bidirectionally. As a first unit, the initiator device is connected to the second data line, and subsequently at least one branch device follows.

Since the individual sub-chains each have a dedicated data line, the first data line may be referred to as a data line of a first type. In general, there are as many data lines as sub-chains. For example, if there are three sub-chains, exactly three branch devices are installed and three sub-chains are formed, a data line of the first type being present within each sub-chain. As a result, in this case there are thus exactly three first data lines. The difference between the first and second data line makes it possible for each first data line to be configured differently from the second data line, which is typically only provided once. Thus, the first data line may be arranged on a circuit board in each case, and the second data line may for example take the form of a cable. This results, in a particularly advantageous manner, in a flexible construction which is based in particular on the application scenario in an automobile.

In one aspect of the present invention, the branch device upstream from a sub-chain acts as a master unit for the at least one client device of this sub-chain, and the at least one client device acts as a slave unit with respect to this branch device. This has the advantage that the client devices can receive commands from the branch device and the commands are subsequently passed through or executed by the client devices. The branch device thus provides a command which is passed through the sub-chain and carried out and passed on by each client device. Moreover, it is also possible to address an individual client device using an address, in such a way that the corresponding command from the branch device is addressed to this one specific client device through the chain. If the command has been carried out, it is also possible to convey a result from the associated client device back to the preceding client device and subsequently to provide the end result to the branch device. Bidirectional communication within the sub-chain is advantageous for this scenario. The command is advantageously outputted by the initiator device and passed on, typically unchanged, via the branch devices to the associated client devices.

In a further aspect of the present invention, the initiator device acts as a master unit for the branch devices, and the branch devices act as slave units with respect to the initiator device. This has the advantage that an individual command or a sequence of commands can be created by the initiator device and conveyed to the branch devices. The branch devices thus receive this command or these commands and pass them on, unchanged or adapted, to the client devices. In this case too, it is possible for the branch devices to be addressed individually using an address and optionally also to output return values to the initiator device.

In a further aspect of the present invention, the first data line and/or the second data line are configured bidirectionally. This has the advantage that commands or signals are conveyed in both directions, and as a result it is also possible both for the client devices to transmit return values to the branch devices and for the branch devices to transmit signals to the initiator device. In particular, the individual units can communicate with one another. Preferably, both data lines are configured bidirectionally, it also being possible for only the first data line or the second data line to be bidirectional. Since there are a plurality of data lines of the first type, it is also possible for the individual first data lines to be configured differently. Typically, however, all first data lines are configured identically.

In a further aspect of the present invention, signals on the second data line are modulated with a greater amplitude than signals on the first data line. This has the advantage that by means of the second data line greater distances can be overcome without error. A higher amplitude is based on the difference between zero and one being greater, and the signal modulation thus being less error-susceptible. It is thus possible to implement the first data line on a circuit board and to implement the second data line using a wired line, which is subsequently also accordingly modulated with a greater amplitude as a result of the greater distance.

In a further aspect of the present invention, signals on the second data line are modulated with 10 times greater an amplitude than signals on the first data line. This has the advantage that, surprisingly, this value is particularly advantageous, and the signals can be modulated particularly efficiently on the first data line, and although the signals on the second data line are modulated less efficiently they are much more robust against errors. Surprisingly, it has been found according to embodiments of the invention that precisely the proposed value is particularly well-suited for setting the ratio of the amplitude of the second data line to that of the first data line.

In a further aspect of the present invention, the first data line and/or the second data line are optical or electrical data lines. This has the advantage that a plurality of options can be offered, which can in turn be selected as a function of the application scenario. According to embodiments of the invention, an electric data line is preferably implemented.

In a further aspect of the present invention, the first data line and/or the second data line are electrical data lines which always carry current. This has the advantage that differential transmission is always possible, and as a result there are also no drawbacks of a particularly steep flank while the current is being applied. Rather, there is always a current, and transient oscillation is prevented. The proposed method is thus also insensitive to electromagnetic disturbance. Moreover, it is advantageous to select a configuration of this type because a wired connection can be implemented which has to cover distances of several meters.

In a further aspect of the present invention, each branch device is arranged on a dedicated circuit board along with a sub-chain. This has the advantage that the branch devices, along with the client devices and the associated first data line, can be optimized for short distances, and as a result can simply also be arranged on an individual circuit board. This also reduces error susceptibility, since the client devices are segmented, and individual sub-chains are separated by means of circuit boards.

In a further aspect of the present invention, the branch devices are each configured in such a way that signals on the second data line are passed through the associated branch device when this branch device is in an inactive state. This has the advantage that if one branch device fails the further branch devices connected in series still receive commands and can also send signals back. The defective branch device is thus merely masked out, and corresponding signals are passed through passively. As a result, there is no processing of signals in the defective branch device, but this branch device also does not interrupt the rest of the chain. It is thus advantageous that in the event of a defective branch device merely one sub-chain of a plurality of sub-chains fails.

In a further aspect of the present invention, the client devices are each configured as an LED, motor, sensor, temperature sensor, light sensor, scanner or switch. This has the advantage that different client devices can be provided, an LED being particularly preferred in embodiments according to the invention. The LED may in turn have individual units which emit red, green or blue. In general, however, it is also possible to mix the individual client devices, in such a way that for example LEDs and also sensors are present within the same chain. In addition, one sub-chain may be formed from LEDs, and another sub-chain from sensors. Preferably, however, all client devices are configured identically.

In a further aspect of the present invention, the client devices are set up to provide at least one piece of status information to the branch device. This has the advantage that the branch device can instruct that a particular value should be read out, and subsequently this command is passed through the sub-chain to the addressed client device, and this client device returns the requested value again via the other client devices. In this context, bidirectional communication is particularly advantageous.

Figure 3:
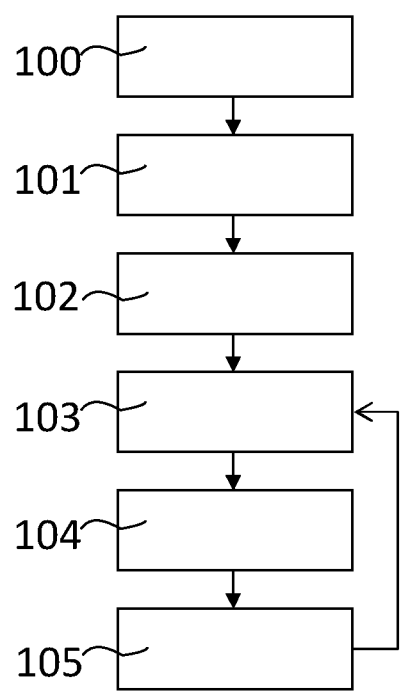
FIG. 3: a flow chart of a method for use in an automobile for low latency and fail-safe command propagation allowing a targeted actuation of each of a plurality of client devices in real-time according to an aspect of the present invention.

FIG. 3 show a flow diagram of a method for use in an automobile for low latency and fail-safe command propagation allowing a targeted actuation of each of a plurality of client devices in real-time, comprising operating 100 an initiator device I arranged to generate and initiate commands; operating 101 a series of branch devices BD communicatively coupled to the initiator device I via an Initiator Side Port ISP, the series of branch devices BD being communicatively connected using a transmission medium; operating 102 the plurality of client devices CD being segmented into a plurality of serial branches each of at least two client devices CD along a branch type data line each branch being connected to respectively one branch device BD, characterized in that each branch device BD directly provides 103 commands generated and initiated by the initiator device I to respectively a first client device CD using a Client Side Port CSP of respectively one branch being connected with the branch device BD according to a configured mode M0, M1, M2, . . . , M6, wherein the command is further propagated 104 to the at least one further client device CD via the Client Side Port CSP of the respective branch device BD, the mode being configured 105 as a function of the generated command and by a number of received link attention events, wherein the command provides an expiry condition of the mode after which the mode returns to its previous mode and the mode rules that a first pair of ports is addressed using a switch mode, while packages on a path of a separate pair of ports may be routed.

In this context, a person skilled in the art will appreciate that the described method steps may be carried out iteratively and/or in a different order. In addition, individual method steps may comprise sub-steps.

Figure 4:
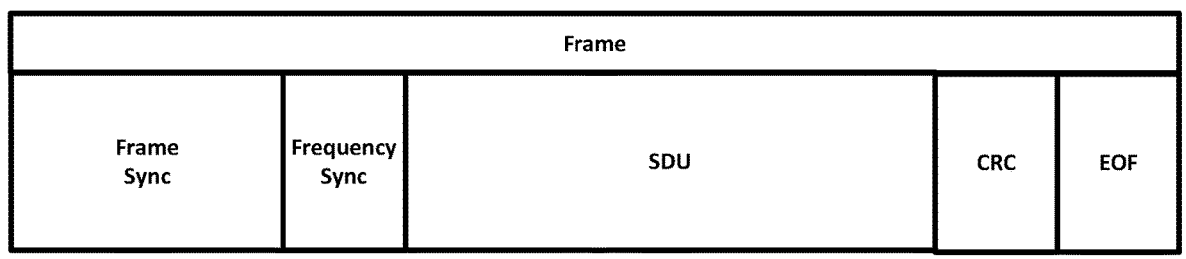
FIG. 4: a frame structure with a synchronization field according to an aspect of the present invention.
Figure 4:
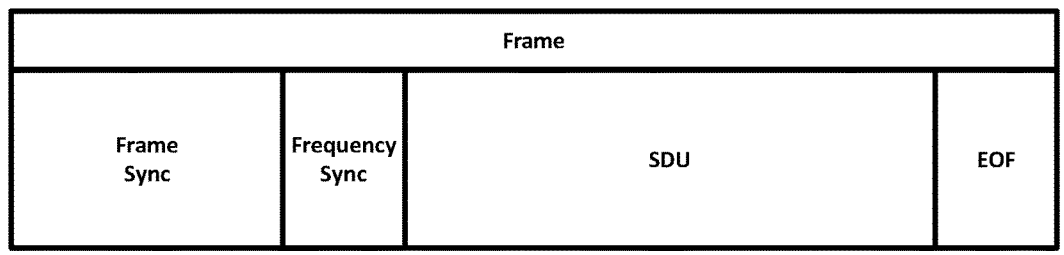

FIG. 4 shows a frame with optional cyclic redundancy check portion, see the upper figure with CRC, the lower figure without. In general data transmitted through the suggested system arrangement is denoted as data, packages, frames, information or message. The decoded Frame Synchronization event is defined as Link attention. Once a Frame Sync is received the number of received link attention events is incremented. In this way, upon reception of such an expiry criteria the mode may be switched back to a previous mode. The branch device may receive a command which provides to information to switch to a certain mode. The mode shall be maintained for a certain number of events, for instance commands. Each command holds a sync frame. Once the specified number of commands, and therefore sync frames is received the branch mode switches back to the previous mode.

This provides the technical advantage that no explicit switch back instruction has to be sent but in the switching command the switch back condition is already provided.

This provides the technical advantage that no further command has to be transmitted.

Moreover, this provides the technical advantage that the suggested approach is fail-safe against message loss and moreover can be operated in real time.

Figure 5:
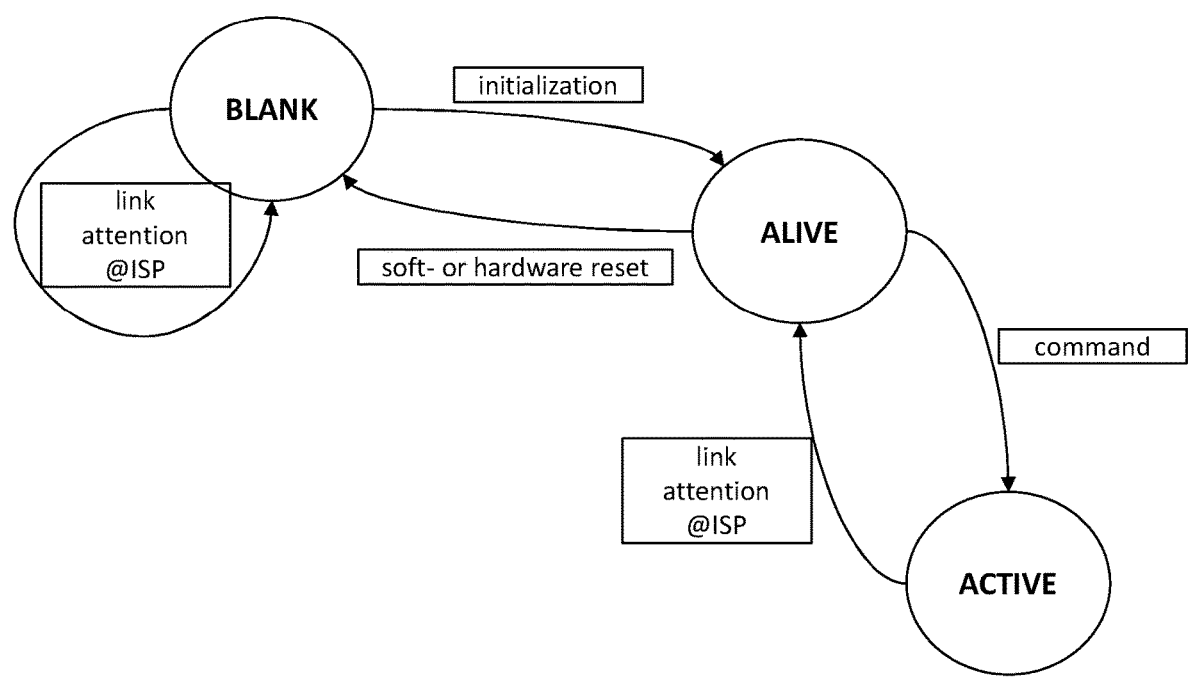
FIG. 5: a state diagram showing states and transitions of the branch devices according to an aspect of the present invention.

FIG. 5 shows an example of transition in the branch device state machine. The diagram once again demonstrates the function of the link attention event, which might change the state from one state to a previous state. The link attention event can also achieve that a currently held state is maintained.

Figure 6:
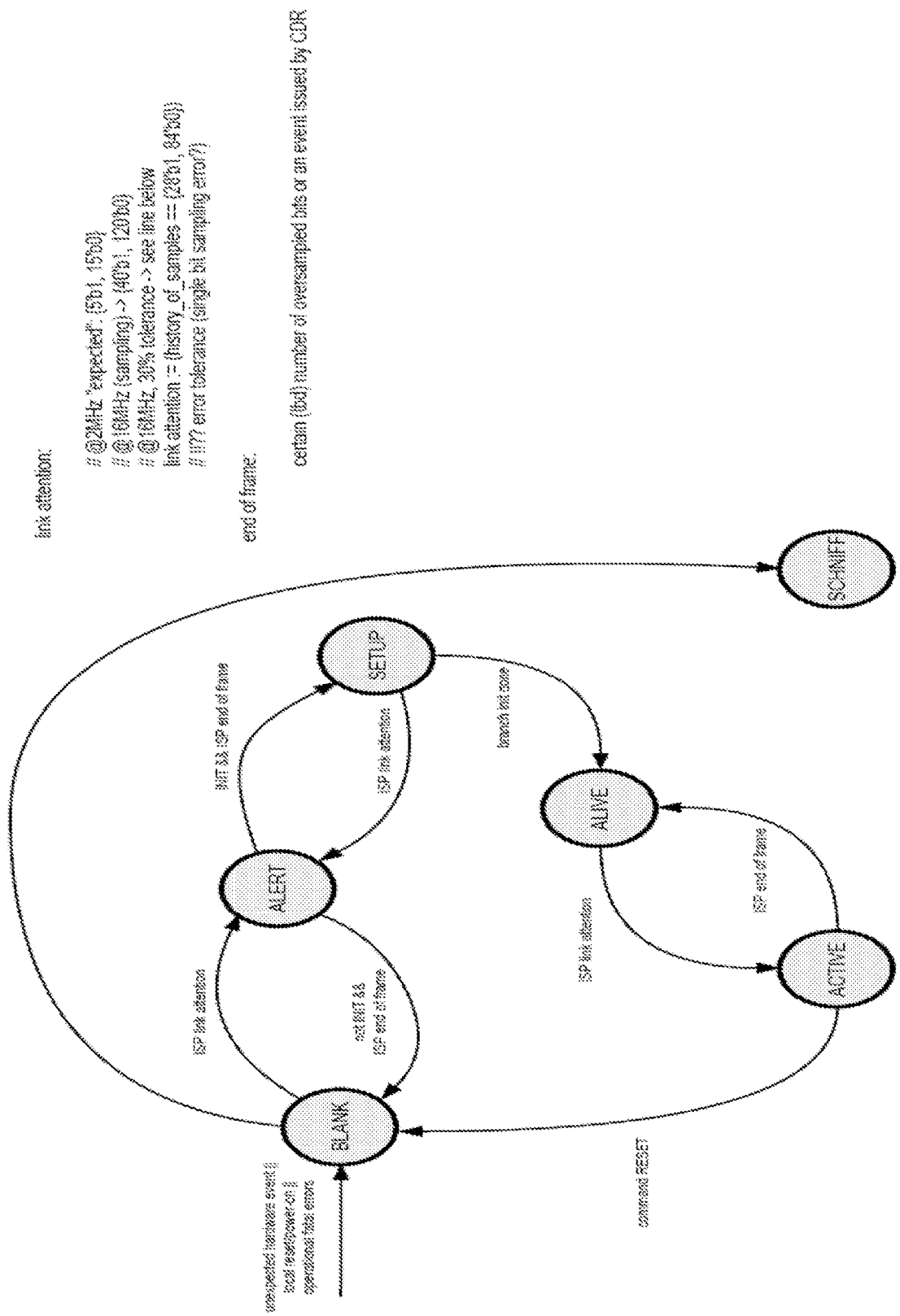
FIG. 6: a further state diagram showing states and transitions of the branch devices according to an aspect of the present invention.

FIG. 6 shows a further state diagram showing states and transitions of the branch devices according to an aspect of the present invention. As part of a network, every Branch Device may be at any time in one of six different states. The states are described in the following:

BLANK: After power up or reset, the branch device shall be in BLANK state. In that state, no network address is assigned and all incoming datagrams shall be discarded.

ALERT: A state where only an INIT command is accepted.

SETUP: A state in which a unique network address is assigned to the Branch Device, thus the node becomes part of the network and starts to explore the Branch.

ALIVE: A state where all network relevant operations of a Branch Device are operational according to the Forwarding Mode currently effective.

ACTIVE: A state in which the Branch Device:
Performs network relevant operations according to the currently effective Forwarding Mode
executes elements of ILaS protocol
performs device specific functions SNIFF: A state where the Branch Device has no assigned network address and is bidirectionally transparent for Frames arriving at ISP (forwarded to ESP and CSP) or ESP (forwarded to ISP and CSP).

A Branch Device in state ALERT parses incoming commands to detect an INIT command from which is takes its network node address. Receiving such an INIT command the Branch Device does not return to BLANK state but executes the protocol to initialize its Branch, i.e. to initialize the chain of Client Devices connected to its CSP. Otherwise, it returns to state BLANK.

A Branch Device in state SETUP executes the protocol to initialize its Branch. For sake of failsafe network operation and to stay manageable by the Initiator Device it returns to state SETUP in case of a Link Attention event at its ISP (which is unexpected while being in state INIT).

A Branch Device in state ALIVE performs routing of Frames between ISP and ESP and/or CSP according to the rules of active Forwarding Mode. A Link Attention event at ISP triggers the transition to state ACTIVE.

A Branch Device in state ACTIVE performs routing of Frames from its ISP to ESP and/or CSP according to the rules of active Forwarding Mode. In case the command originated by the Initiator Device requests a local operation, for example read data from local registers or write data to local registers or change the mode of forwarding operation, it is executed. When a device is set from ACTIVE state to BLANK state by a reset command, it shall automatically generate a Reset command at CSP and ESP to ensure that the entire network receives the Reset Command despite the previous active routing mode.

Figure 7:
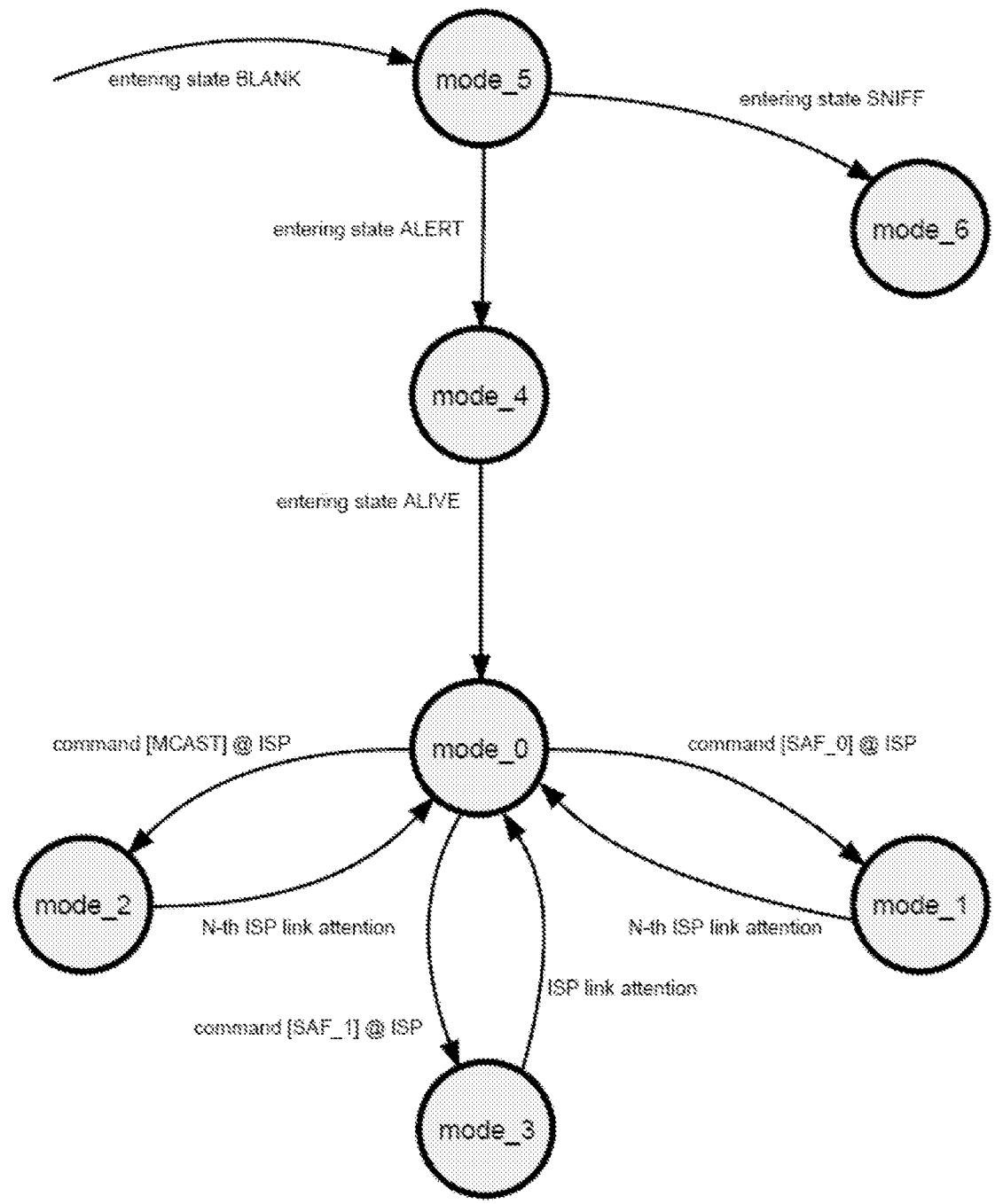
FIG. 7: a mode diagram showing modes and transitions of the branch devices according to an aspect of the present invention.

FIG. 7 shows a mode diagram with modes and transitions of the branch devices according to an aspect of the present invention. There may be 7 Forwarding Modes which define rules how Frames received at ISP, CSP, ESP are forwarded to ESP, CSP, ISP and whether messages are to be generated on reception of Commands or Responses as defined by the ILaS protocol layer. ILaS is a registered trademark and refers to the concepts according to embodiments of the present invention.

After transition to state ALIVE the effective Forwarding Mode of a given Branch Device is selected either explicitly by commands issued by the Initiator Device or implicitly when a certain number of Link Attention events at ISP were detected.

This number can be specified previously by the Initiator Device together with the command requesting the change of effective Forwarding Mode. Forwarding Mode transitions and their triggers are shown in the figure.

FIGS. 8 to 15 show specific modes of the branch device. At least one branch device BD is operated in a state in which the branch device BD performs network relevant operations and performs device specific functions, the branch device BD performing switching or routing operations on pairwise ports IS, CSP, ESP according to the configured mode, the mode comprising: a mode where all incoming packages are forwarded; a mode where packages are only forwarded in case of an address match where the command provides an address of at least one branch device BD; a mode where the connected client devices CD are read out; a mode where the connected client devices CD are instructed; a mode where incoming commands are first parsed; a mode where incoming commands are directly passed on; and/or a mode where an incoming command is adapted as a function of a branch device BD address. These modes are described in the following with reference to the figures. The system arrangement is shown on the left side while the signal behavior in the ports ISP, CSP and ESP is shown in the right side.

Figure 8:
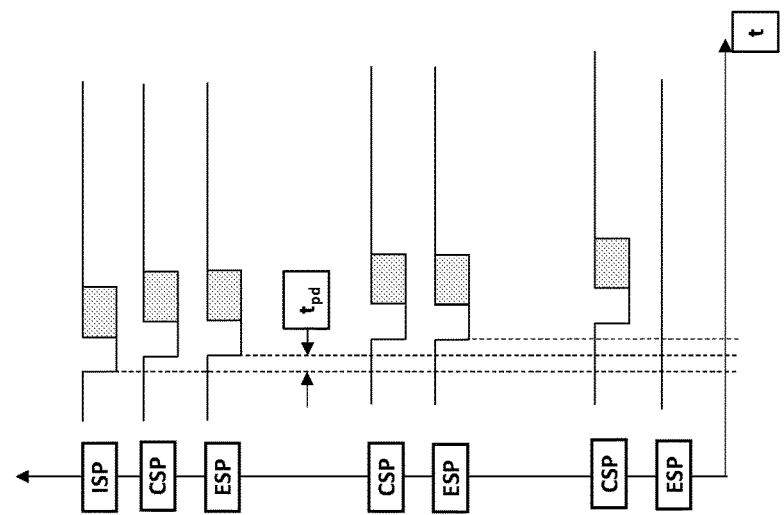
FIG. 8: a block diagram of a system arrangement and respective message flow according to Mode M0 according to an aspect of the present invention.
Figure 8:
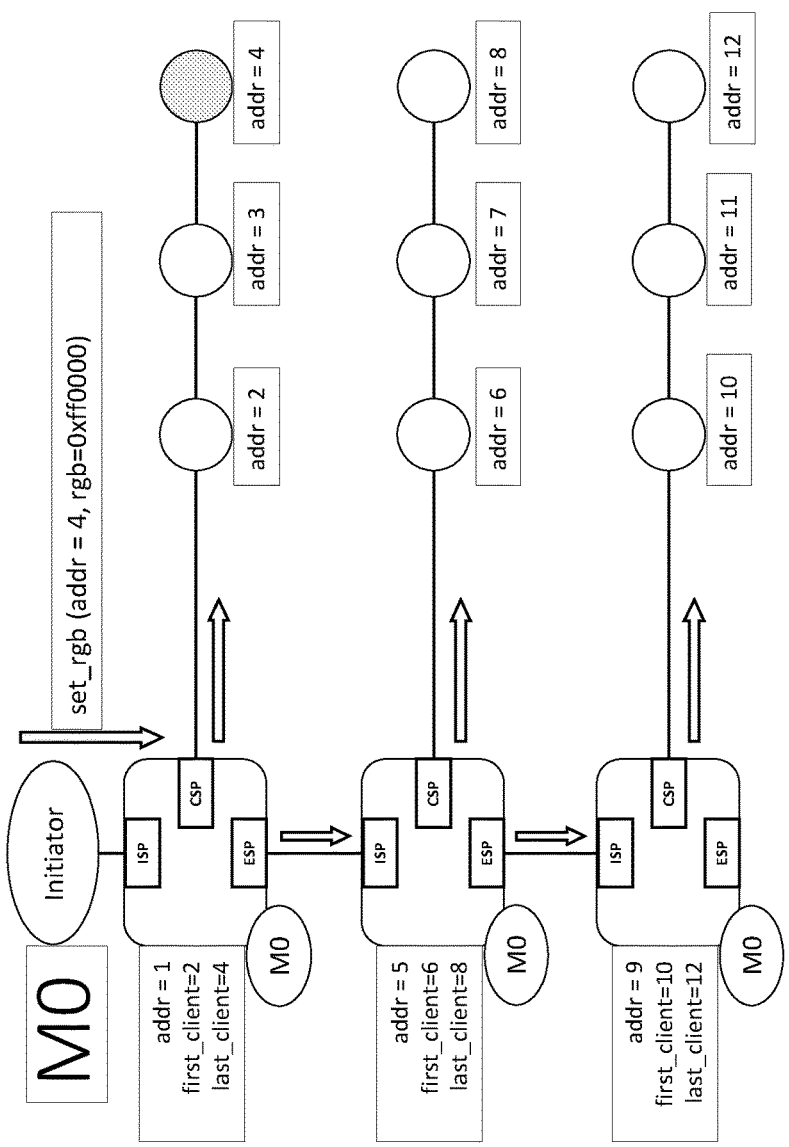

FIG. 8 depicts a block diagram of a system arrangement and respective message flow according to Mode M0 according to an aspect of the present invention. In this mode, all incoming commands are forwarded directly to CSP and ESP. The command interpretation is performed afterwards in order to allow lowest time propagation delay. Responses from ESP or CSP are forwarded directly to ISP. Commands are only executed at the addressed device (addr=4 in the example). The rest of the network nodes ignore the command. After being initialized (M4 mode), Branch Devices are in M0 mode by default.

Figure 9:
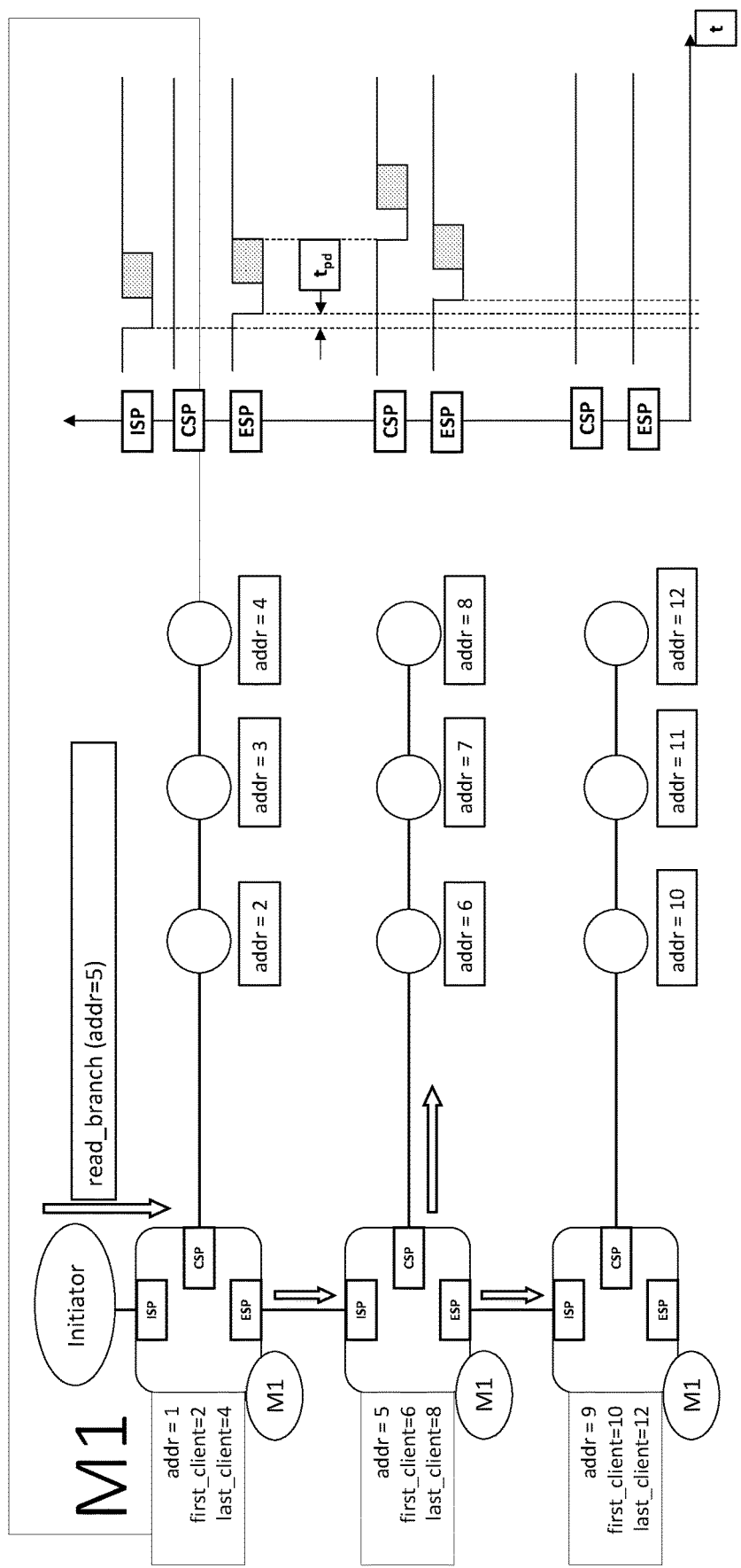
FIG. 9: a block diagram of a system arrangement and respective message flow according to Mode M1 according to an aspect of the present invention.

FIG. 9 depicts a block diagram of a system arrangement and respective message flow according to Mode M1 according to an aspect of the present invention. In this mode, incoming commands are forwarded directly to ESP to allow lowest propagation delay. The forwarding to the CSP is only performed in case of an address match (addr=5 in the example) which results in a longer propagation delay compared to the ISP/ESP path. Responses from ESP or CSP are forwarded directly to ISP. The M1 mode is required to run read_branch routines. The M1 mode can be enabled by a dedicated command after being in M0 mode. This command carries a number to define after how many subsequent commands the device returns to M0 mode. This allows several readouts in row.

Figure 10:
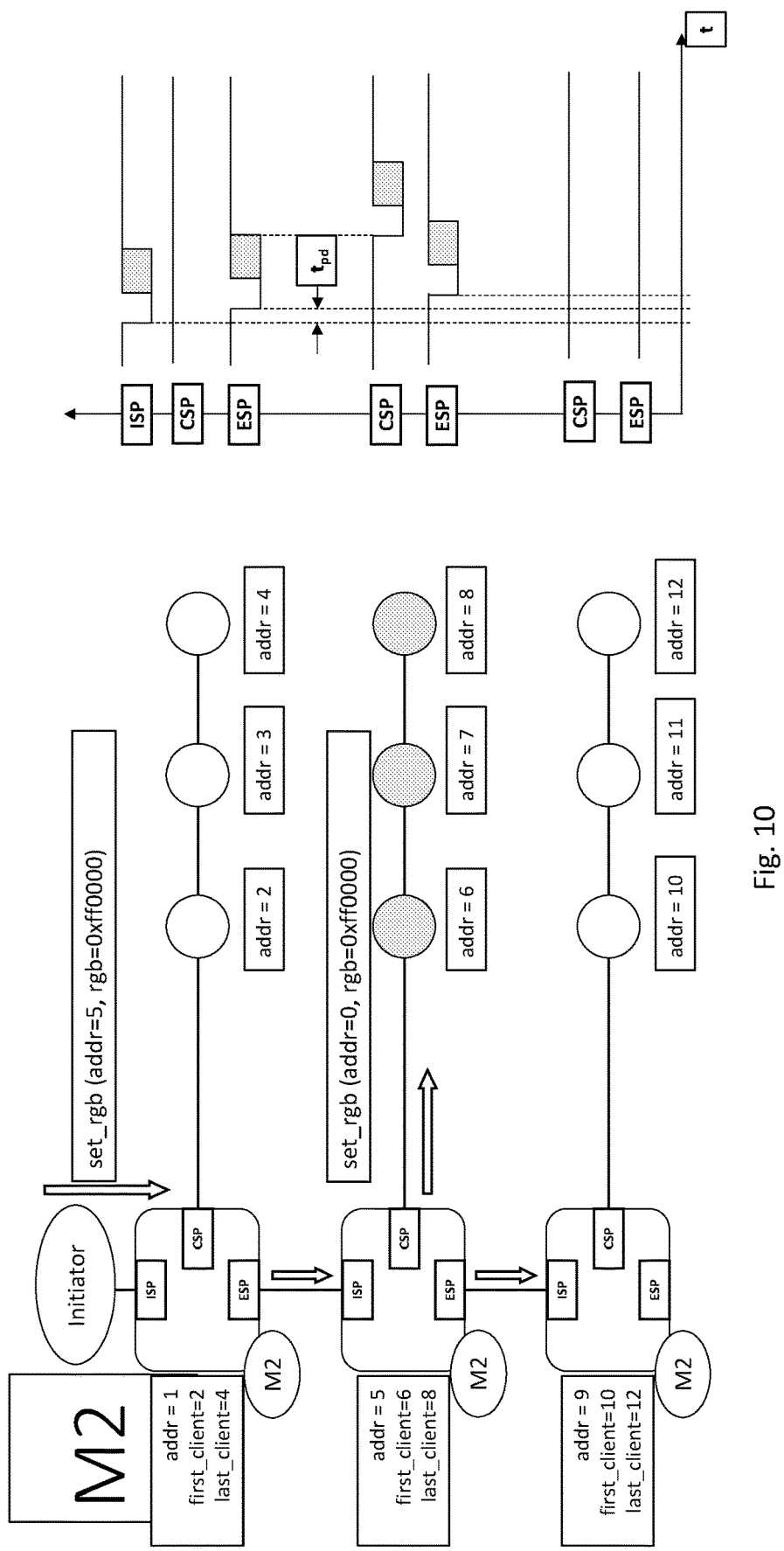
FIG. 10: a block diagram of a system arrangement and respective message flow according to Mode M2 according to an aspect of the present invention.

FIG. 10 depicts a block diagram of a system arrangement and respective message flow according to Mode M2 according to an aspect of the present invention. In this mode, incoming commands are forwarded directly to ESP to allow lowest propagation delay. The forwarding to the CSP is only performed in case of an address match (addr=5 in the example) which results in a longer propagation delay compared to the ISP/ESP path. The command is not only forwarded, but the address is also converted into a broadcast to control all clients of the branch with one command. Responses from ESP or CSP are forwarded directly to ISP. The M2 mode can be enabled by a dedicated command after being in M0 mode. This command carries a number to define after how many subsequent commands the device returns to M0 mode. This allows several multicast commands in row.

Figure 11:
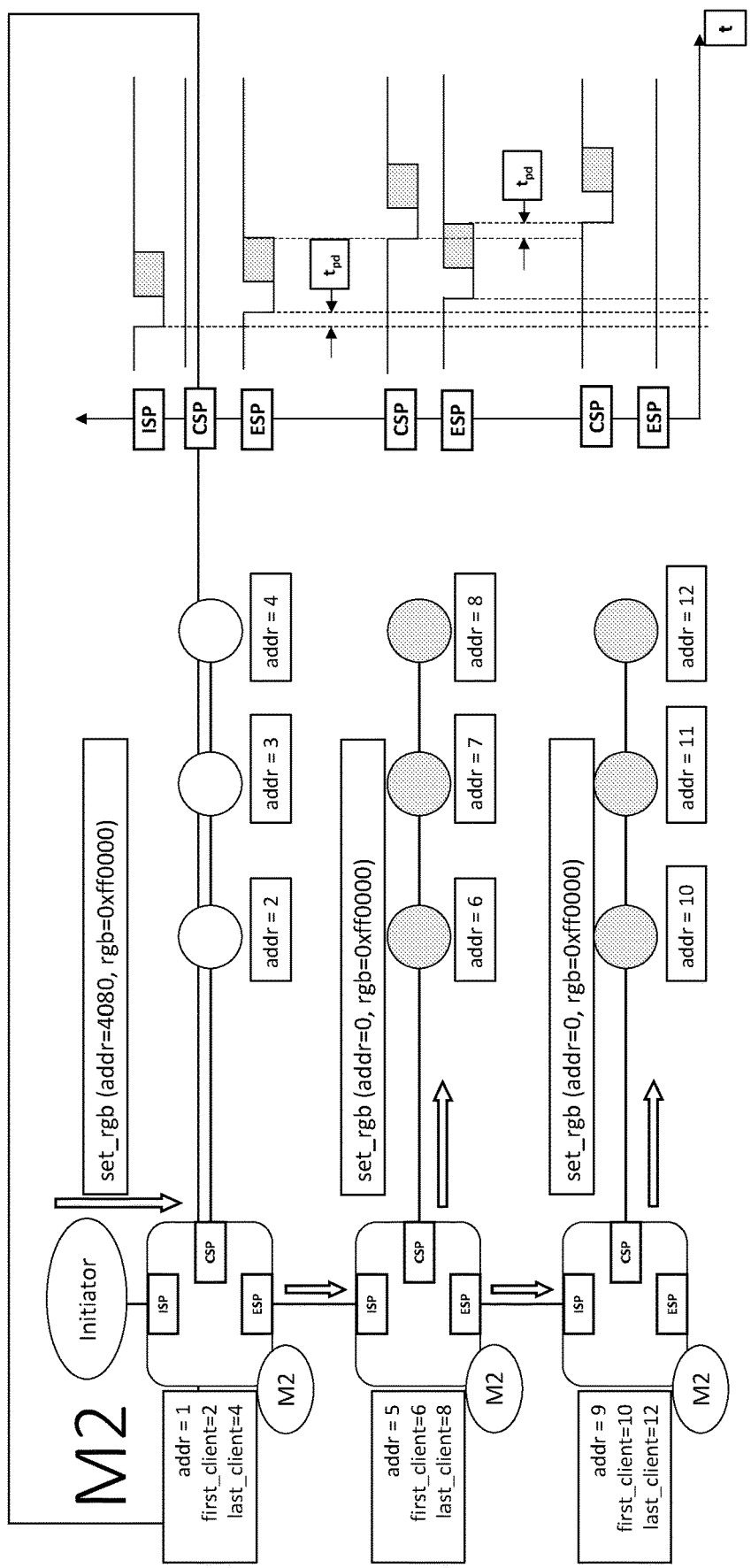
FIG. 11: a block diagram of a system arrangement and respective message flow according to Mode M2 according to an aspect of the present invention.

FIG. 11 depicts a block diagram of a system arrangement and respective message flow according to Mode M2 according to an aspect of the present invention. In combination with the setting of multicast groups, several branches can be addressed with one command, as well. Not shown here is the sequence in which addr=5 and addr=9 were assigned by Define_MCast command to group 0. In contrast to FIG. 10 the present FIG. 11 shows that two, or more, branches can be addressed. A possible difference between Mode M1 and Mode M2 is that a specific mode may be implemented for reading instructions on the clients and one might be implemented for writing instructions. As can be seen in the writing instruction of M2 the address is changed that the broadcast address 0 is inserted.

Figure 12:
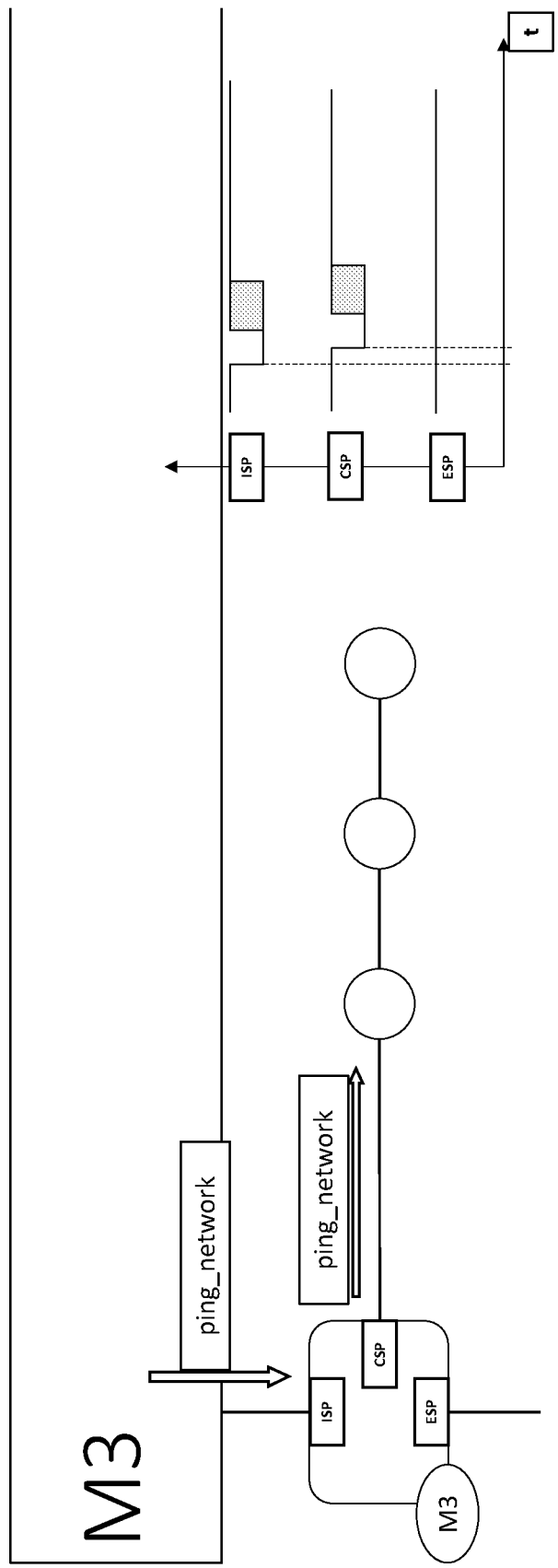
FIG. 12: a block diagram of a system arrangement and respective message flow according to Mode M3 according to an aspect of the present invention.

FIG. 12 depicts a block diagram of a system arrangement and respective message flow according to Mode M3 according to an aspect of the present invention. In this mode, incoming commands are forwarded directly to CSP to allow lowest propagation delay while the command forwarding to ESP is disabled. Responses from ESP or CSP are forwarded directly to ISP. The M3 mode is required to run a ping_network routine. The mode can be enabled by a dedicated command. After one ping_network routine, the Branch Device shall return to M0 mode.

Figure 13:
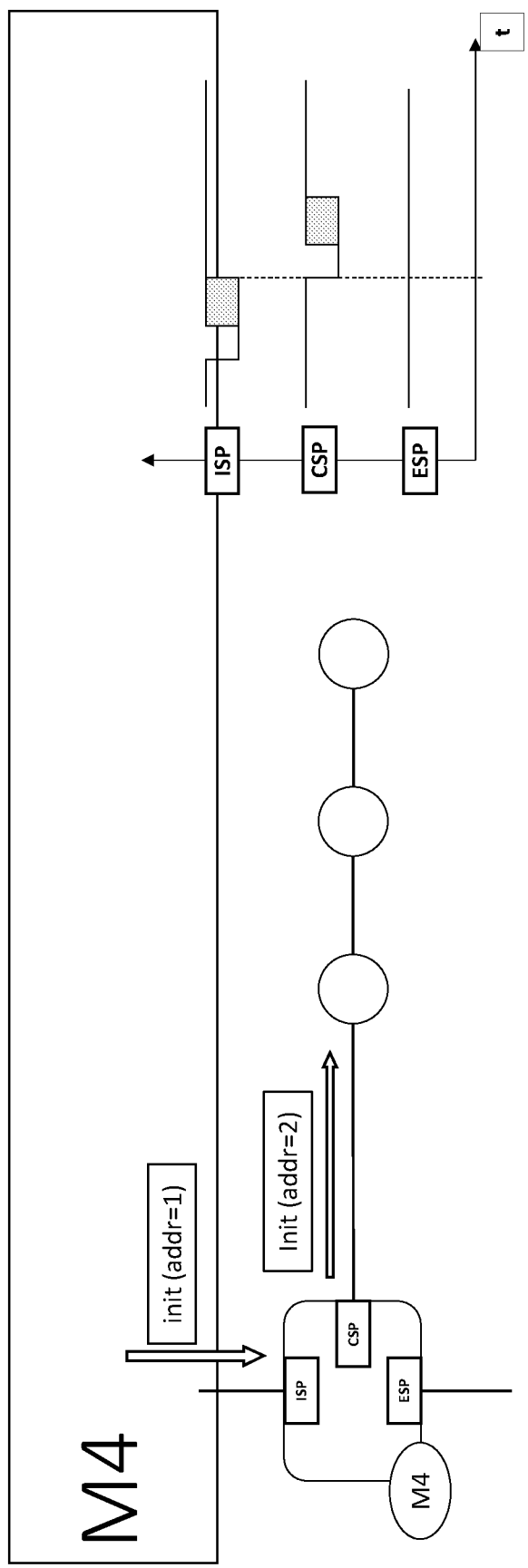
FIG. 13: a block diagram of a system arrangement and respective message flow according to Mode M4 according to an aspect of the present invention.

FIG. 13 depicts a block diagram of a system arrangement and respective message flow according to Mode M4 according to an aspect of the present invention. In this mode, incoming commands are parsed first. This allows to react to specific commands only and results in an increased propagation delay. Only initialization commands are forwarded from ISP to CSP— and at the same time modified (address). The forwarding from ISP to ESP is disabled. Responses from ESP or CSP are forwarded directly to ISP. This mode can only be enabled after being in M5 mode and is required for the initialization routine.

Figure 14:
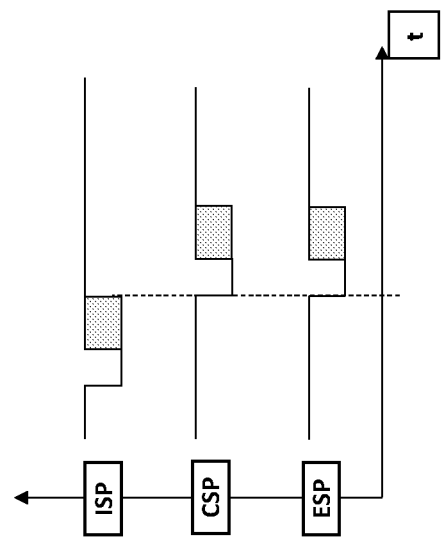
FIG. 14: a block diagram of a system arrangement and respective message flow according to Mode M5 according to an aspect of the present invention.
Figure 14:
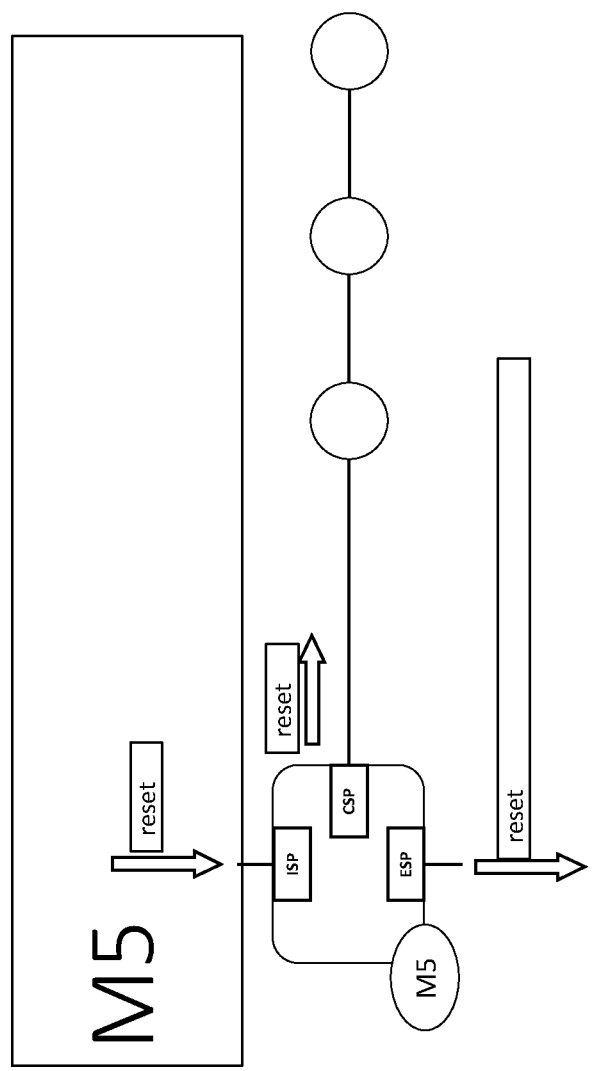

FIG. 14 depicts a block diagram of a system arrangement and respective message flow according to Mode M5 according to an aspect of the present invention. This mode is active when Branch Devices are in BLANK state. In this mode, incoming commands are parsed first. This allows to react to specific commands only and results in an increased propagation delay. Only reset commands from ISP to CSP are forwarded. The forwarding from ISP to ESP is disabled.

Figure 15:
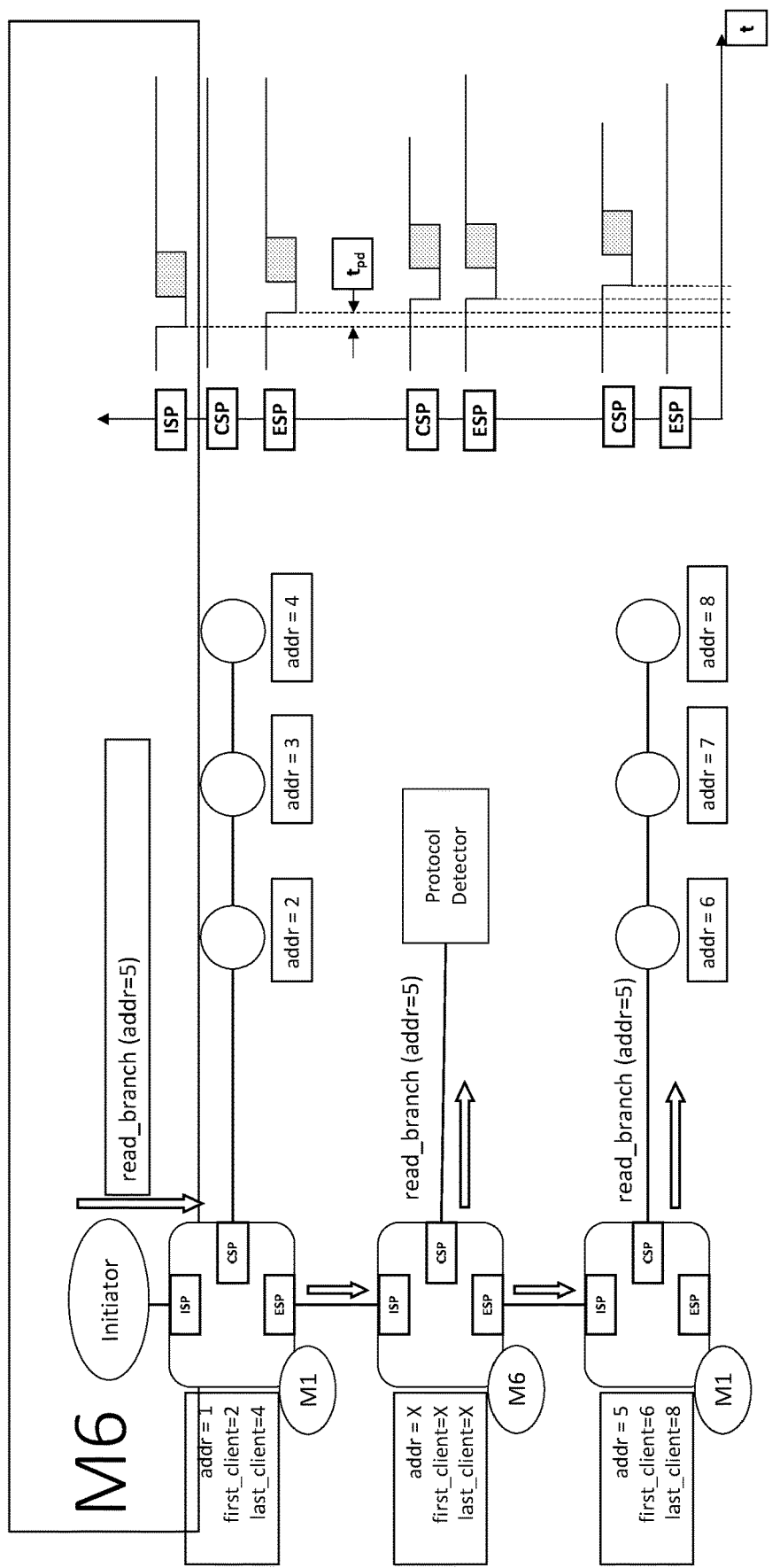
FIG. 15: a block diagram of a system arrangement and respective message flow according to Mode M6 according to an aspect of the present invention.

FIG. 15 depicts a block diagram of a system arrangement and respective message flow according to Mode M6 according to an aspect of the present invention. In this mode, the branch device shall act as an interface for protocol test equipment. The device shall have no own address in order to ensure that the investigated network is not affected. All incoming Commands and Responses are directly forwarded to CSP. The M6 mode can be enabled by programming an OTP bit. The CSP output signal shall be single ended (5Vpp data and clk at SIO2_P/N) to allow easy interoperability for protocol test equipment.

What is claimed is:

1. A system arrangement for use in an automobile for low latency and fail-safe command propagation allowing a targeted actuation of each of a plurality of client devices (CD) in real-time, comprising:
   an initiator device (I) arranged to generate and initiate commands;
   a series of branch devices (BD) communicatively coupled to the initiator device (I) via an Initiator Side Port (ISP), the series of branch devices (BD) being communicatively connected using a transmission medium;
   the plurality of client devices (CD) being segmented into a plurality of serial branches each of at least two client devices (CD) along a branch type data line each branch being connected to respectively one branch device (BD), characterized in that each branch device (BD) directly provides commands generated and initiated by the initiator device (I) to respectively a first client device (CD) using a Client Side Port (CSP) of respectively one branch being connected with the branch device (BD) according to a configured mode (M0, M1, M2, . . . , M6), wherein the command is further propagated to the at least one further client device (CD) via the Client Side Port (CSP) of the respective branch device (BD), the mode being configured as a function of the generated command and by a number of received link attention events, wherein the command provides an expiry condition of the mode after which the mode returns to its previous mode.

2. The system of claim 1, wherein the mode is configured at least between pairwise communication ports of each branch device (BD), the communication ports comprising an Initiator Side Port (ISP), a Client Side Port (CSP) and/or an Extension Side Port (ESP).

3. The system of claim 1, wherein received link attention events are formed by at least one decoded Frame Synchronization event, at least one command, at least one downstream frame, at least one upstream frame, at least one received message, at least one executed command and/or at least one instruction.

4. The system of claim 1, wherein the number of received link attention events is specified by the generated command or a predefined threshold.

5. The system of claim 1, wherein each generated command comprises Frame Synchronization data arranged to indicate a frame start.

6. The system of claim 1, wherein a mode specifies switching, routing, parsing and/or transmission of packages between pairwise ports (ISP, CSP, ESP).

7. The system of claim 1, wherein each branch device (BD) is operated according to a protocol, which is implemented by the initiator device (I) specifying rules according to which each branch device (BD) is operated in one state out of a number of states, the number of states comprising: a state directly after power up, where no address is assigned to the branch device (BD); a state where only an initializing command is accepted; a state in which a unique network address is assigned to the branch device (BD); a state where all network relevant operations of the branch device (BD) are operational; a state in which the branch device (BD) performs network relevant operations and performs device specific functions; a state where the branch device (BD) has no assigned network address and is bidirectionally transparent for frames arriving at Initiator Side Port (ISP), being forwarded to Extension Side Port (ESP) and Client Side Port (CSP), or Extension Side Port (ESP) being forwarded to Initiator Side Port (ISP) and Client Side Port (CSP).

8. The system of claim 1, wherein the client devices are implemented by light emitting diodes and/or sensors and are address per branch by the respective branch device (BD) which forwards commands from the initiator device (I).

9. The system of claim 1, wherein in case of a loss of voltage, a loss of current, an undefined behavior of the branch device (BD) an incoming port (ISP, ESP) passes incoming packages through to an outgoing port (ESP, ISP) without further processing, parsing, routing or switching steps.

10. The system of claim 1, wherein the branch type data line is arranged on a printed circuit board and/or connects printed circuit boards.

11. The system of claim 1, wherein the transmission medium comprises respectively one Unshielded Twisted Pair Cable in between pairwise branch devices or one single Unshielded Twisted Pair Cable along which all branch devices are arranged.

12. A method for use in an automobile for low latency and fail-safe command propagation allowing a targeted actuation of each of a plurality of client devices in real-time, comprising:

operating (100) an initiator device (I) arranged to generate and initiate commands;

operating (101) a series of branch devices (BD) communicatively coupled to the initiator device (I) via an Initiator Side Port (ISP), the series of branch devices (BD) being communicatively connected using a transmission medium;

operating (102) the plurality of client devices (CD) being segmented into a plurality of serial branches each of at least two client devices (CD) along a branch type data line each branch being connected to respectively one branch device (BD), characterized in that each branch device (BD) directly provides (103) commands generated and initiated by the initiator device (I) to respectively a first client device (CD) using a Client Side Port (CSP) of respectively one branch being connected with the branch device (BD) according to a configured mode (M0, M1, M2, . . . , M6), wherein the command is further propagated (104) to the at least one further client device (CD) via the Client Side Port (CSP) of the respective branch device (BD), the mode being configured (105) as a function of the generated command and by a number of received link attention events, wherein the command provides an expiry condition of the mode after which the mode returns to its previous mode.

13. A computer program product comprising a non-transitory storage medium containing control commands which carry out the steps of the method of claim 12.

14. The system of claim 1, wherein at least one branch device (BD) is operated in a state in which the branch device (BD) performs network relevant operations and performs device specific functions, the branch device (BD) performing switching or routing operations on pairwise ports (IS, CSP, ESP) according to the configured mode, the mode comprising: a mode where all incoming packages are forwarded; a mode where packages are only forwarded in case of an address match where the command provides an address of at least one branch device (BD); a mode where the connected client devices (CD) are read out; a mode where the connected client devices (CD) are instructed; a mode where incoming commands are first parsed; a mode where incoming commands are directly passed on; and/or a mode where an incoming command is adapted as a function of a branch device (BD) address.

* * * * *